April 13, 1965  C. R. ZIMMERMAN  3,177,830
SEED DRILL
Filed Jan. 29, 1962  7 Sheets-Sheet 1

INVENTOR.
Clarence Robert Zimmerman
BY
Wells & St. John
Attys.

April 13, 1965 C. R. ZIMMERMAN 3,177,830
SEED DRILL
Filed Jan. 29, 1962 7 Sheets-Sheet 2

INVENTOR.
Clarence Robert Zimmerman
BY Wells & St. John
attys.

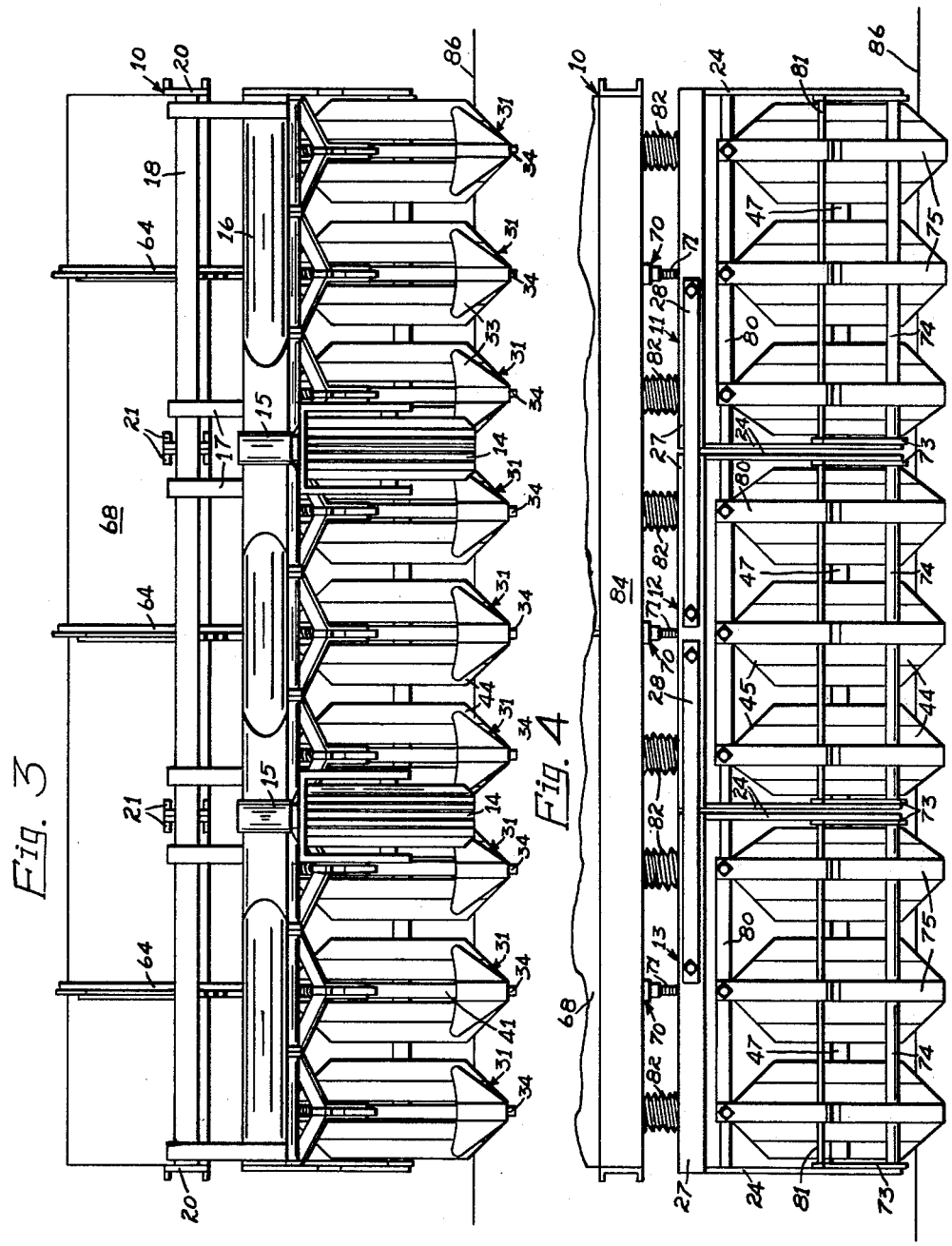

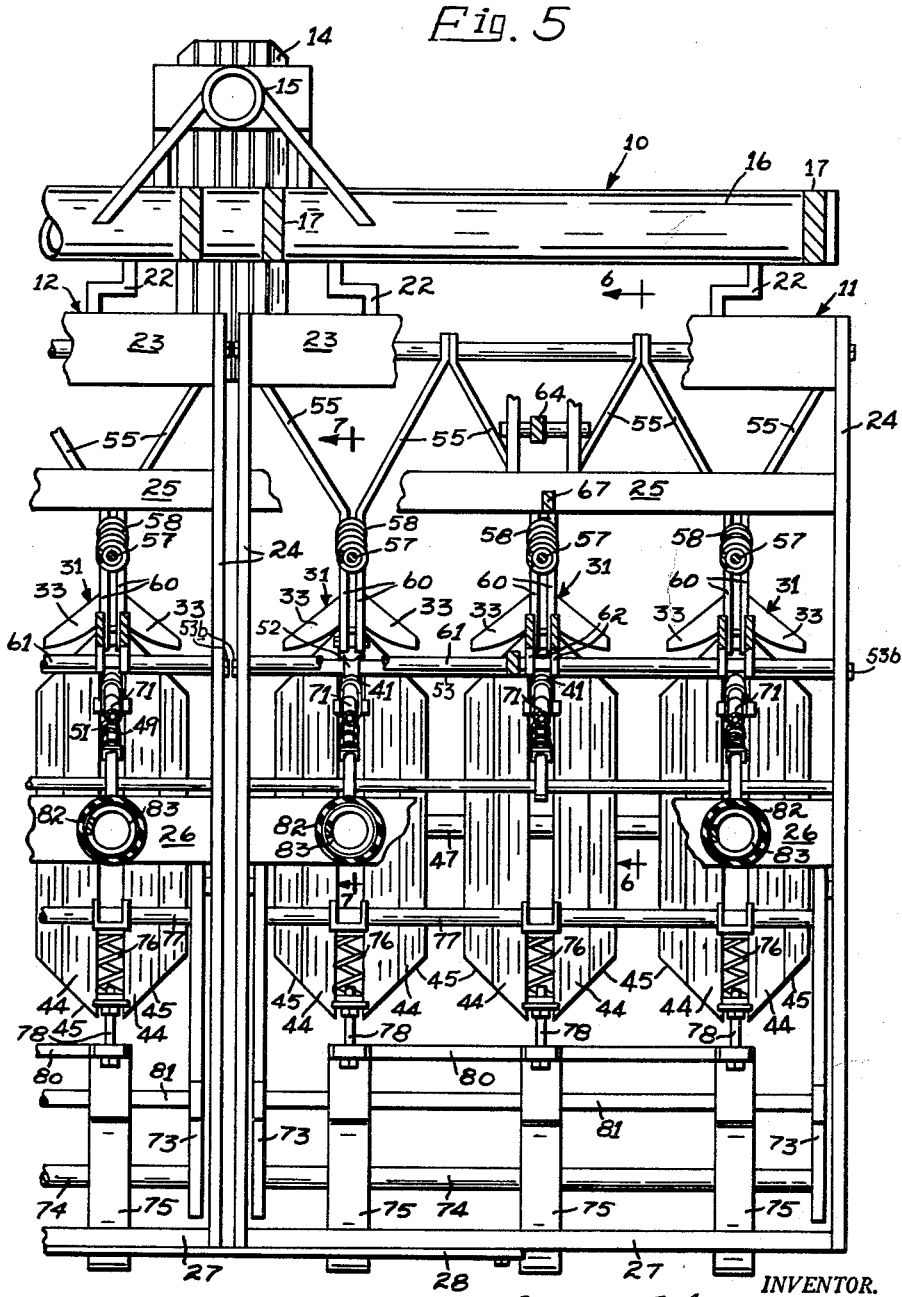

April 13, 1965    C. R. ZIMMERMAN    3,177,830
SEED DRILL
Filed Jan. 29, 1962    7 Sheets-Sheet 5
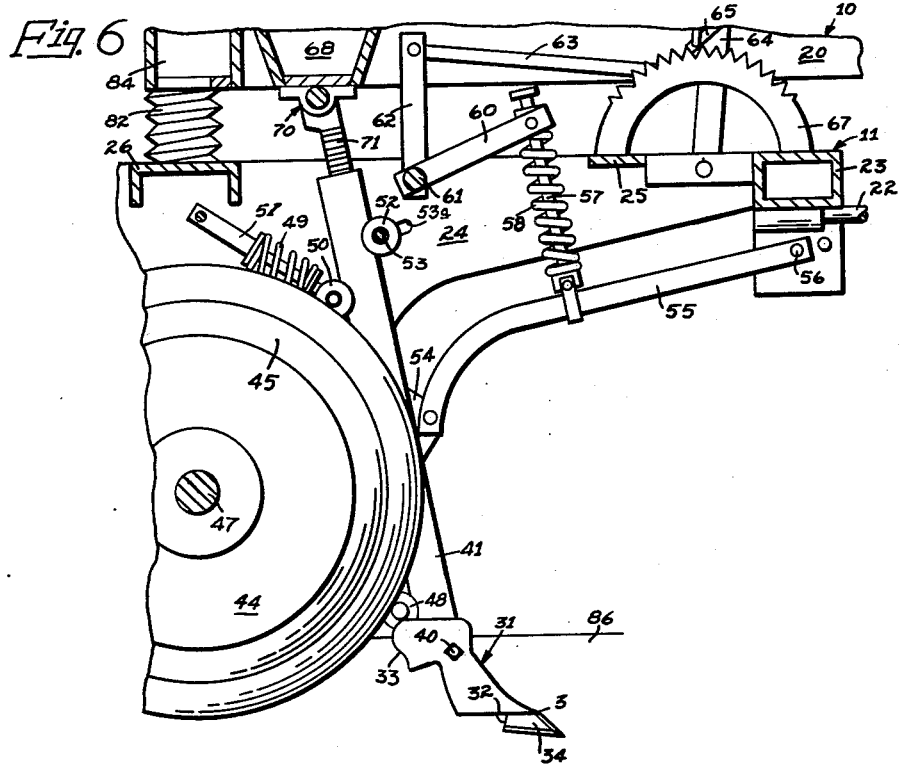
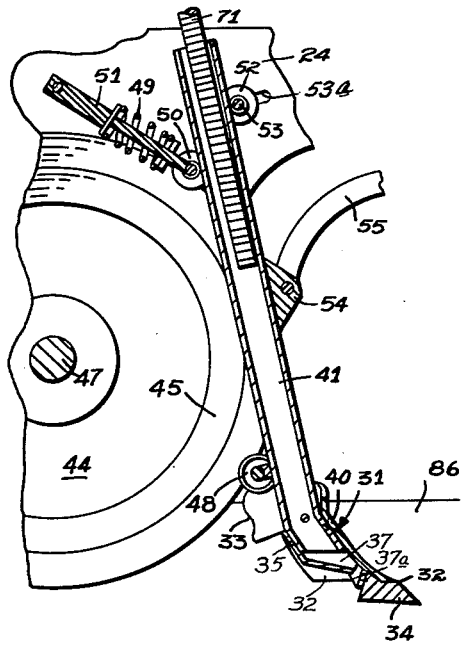
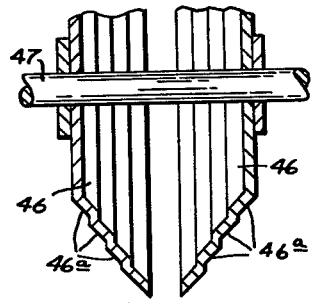
INVENTOR.
Clarence Robert Zimmerman
BY Wills & St.John
Attys.

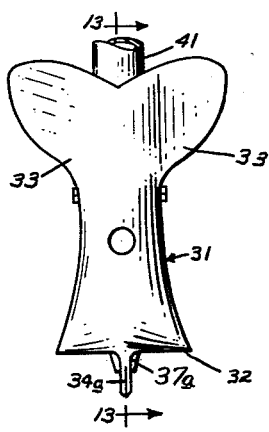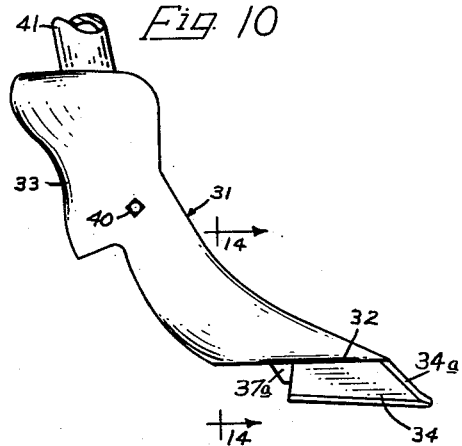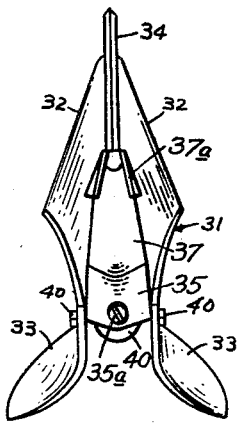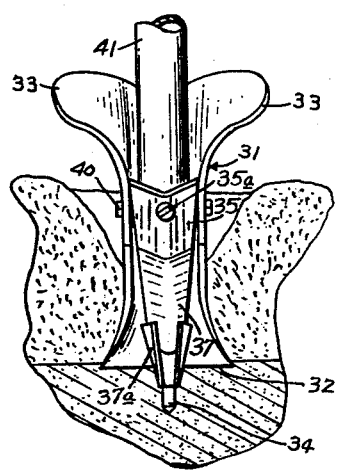

INVENTOR.
Clarence Robert Zimmerman
BY Wells & St. John
Attys.

United States Patent Office 3,177,830
Patented Apr. 13, 1965

3,177,830
SEED DRILL
Clarence Robert Zimmerman, Box 6, Almira, Wash.
Filed Jan. 29, 1962, Ser. No. 172,368
8 Claims. (Cl. 111—85)

My invention relates to a seed drill.

The most pressing problem encountered in commercial wheat production is the establishment of an even stand of winter wheat. This problem is particularly acute in the dry areas in which such crops are normally raised. The farmer must insure that the seed is positioned in moist soil and must accurately control the soil cover above the seed.

Seeding equipment should theoretically be adaptable to all soil and climate conditions and should be usable regardless of ground contour, without disturbing proven farming procedures. With equipment available today, a good stand of winter wheat can be anticipated where a dry mulch of one to four inches in depth overlays moist, compacted soil. Common deep furrow drills cannot be safely used where surface moisture is present, or where the dry mulch cover exceeds four or five inches in depth. Since moisture depth is extremely critical, a producer will often wait for a rainy period or a dry period, thereby endangering his crop by delay.

In some areas the practice of stubble mulching is followed which keeps the stubble from the last year's crop partially imbedded in the topsoil. This is very good for the soil because it keeps the blowing of the soil to a minimum and it retards washing of gullies in heavy rains or when snow melts off. A great many farmers who have hilly fields which erode badly would like to adopt the practice of stubble mulch farming. They are presently forced to burn their stubble because there is not a drill available which will seed wheat on steep hillsides and operate through trash common to stubble mulch farming. These farmers can only seed with disc drills which will not operate in trash. Any attempt to use the present staggered hoe drills produces poor results because the drills move along the hill in a canted angle and the seed is planted between the furrows with so much dirt on top that it cannot emerge.

With the present deep furrow equipment it is unheard of and would be considered poor judgment to attempt to establish a stand of winter wheat where you had to go deeper than six inches to moisture. Since a large part of our winter wheat in the United States is raised on dry land under low rainfall conditions, poor yields are caused by uneven stands and wheat seeded too late. A great deal of erosion occurs because of lack of equipment which will operate properly on steep hillsides.

In areas experiencing severe winters, winter wheat seeded in shallow furrows "winter kills" easily and has been unsuccessful. It has been found that winter wheat seeded in deep furrows which trap the winter snow and protect the plant from cold winds will do very well.

A wheat plant is a shallow seeded plant. It develops better when it is not covered more than two inches deep for many reasons. First, the plant has remarkable pushing strength up to two inches and can push through most crusts that might form. When planted shallow, the wheat plant can develop its permanent root system immediately. Before extremely low temperatures are encountered, it has a well-developed root system and is a strong, hardy plant. When seeded at a depth beyond two inches, the seedling loses its strength so that a slight crust or clod will cause it to curl. Also, the formation of a permanent root system will be retarded until additional moisture is available to the spent seed. Until the permanent root system has developed, the plant grows very slowly and goes into the winter as a weak plant.

There are presently available commercially for seeding two types of openers for deep furrow drills, the shovel and the spear point. The present shovels deposit the seed on top of the moist dirt, not into it, and any attempt to keep most of the dry dirt from covering the seed leaves the seed exposed to drying out before it can sprout. With this present shovel, you have to rely on three or so inches of dry dirt for insulation. The shovel also floats on the moist seed bed but will not penetrate hard areas to moisture. The spear point inserts the seed into moisture and penetrates the harder areas but lacks depth control as it will not float and seeds too deep in soft areas when set to penetrate the harder areas.

The difficulties of proper planting have been enhanced by the development of new, short straw varieties of winter wheat which increase the yield but which also are more exacting insofar as planting conditions are concerned. They require adequate moisture for sprouting, but do not emerge readily if covered with two or more inches of dry soil.

It is the purpose of my invention to provide a new in-line hoe type drill wherein the hoe or shovel has an opening shoe operable to shear off the dry mulch layer of soil with a thin slice of the moist soil and lay this over so the moist soil is on the inclined face of the furrow. The shovel further has a seed trench opening blade beneath it with a forwardly and downwardly extending tip designed to cut through hard packed soil with a minimum of break-up of the existing soil structure laterally of the blade, together with a pair of packing wheels, one on each side of the shank that carries the shovel, and located to drag any trash or straw from the shank. The wheels are preferably sloped upwardly and outwardly to press the sloping surfaces of the furrow immediately after the shovel leaves them so as to keep the dry soil from covering the seed trench by falling back after it is passed by the shovel.

Specifically, it is a purpose of my invention to provide in combination, a shovel operable to lift and turn over an upper layer of the soil, a seed trench forming blade beneath the shovel having a digging point thereon to slice into the soil beneath the shovel, with furrow slope packing wheels juxtaposed behind the shovel and inclined upwardly away from the seed trench at the bottom of the furrow to keep the soil on the furrow slopes away from the trench and pack this soil, the packing wheels carrying the weight of the shovel and frame, and means on the shovel to deliver seeds into the trench beneath the shovel and in advance of the wheels.

Another object of my invention is to provide a novel shovel and seed trench forming or slotting blade wherein the lower forward edge of the shovel is a flat V-shaped horizontal cutting edge to slice through the soil, the shovel top front surface curving upwardly and rearwardly from the cutting edge to turn over the soil above the cutting edge and the slotting blade has its front edge extending forwardly and downwardly from the front tip of the cutting edge terminating in a point below and in front of the cutting edge to penetrate packed soil, the blade extending rearwardly beneath the shovel to open a seed receiving trench, the shovel carrying means to direct seeds into the trench. This shovel will "float" at moisture level and still penetrate hard points with a minimum of disturbance of the soil structure allowing capillary action to take place around the seed.

A further object of my invention is to provide in a drill a novel shovel and two pressure wheel combination wherein two pressure wheels are spaced apart to leave unpressed a narrow line of soil centrally behind the shovel and are inclined inwardly toward their axes from this narrow line of soil transversely outward from each other to compact the sloping sides of the furrow made by the shovel, the pressure wheels overlapping the supporting shank of the shovel to remove trash lodging thereon as it is carried upward by the shovel. This combination of shovel and press wheels produces only one furrow with the seed in the bottom of the furrow and allows no chance for dry dirt to fall between the shovel and the press wheels.

A further object of this invention is to provide a drill shovel arrangement capable of adjustment to match field conditions. This is accomplished primarily by lateral adjustment of the press wheels relative to the shovels. For hot, dry conditions a narrow furrow with several inches of dry dirt for insulation is advisable to prevent the seed from drying out. During cloudy, threatening weather a wider furrow with less dry dirt covering is desirable as insurance against possible damage from rain.

It is another object of this invention to provide the proper weight distribution between the compacting elements in order to insure the proper compacting of both the sides of the furrows and the bottom of the furrow in which the seed has been placed. It is necessary to cover the seed, but the pressure exerted upon the soil over the seeds must not be too great so as to retard germination.

Another object of this invention is to provide a drill which, because it is in-line, may be pulled at faster speeds through trashy ground. The drill is self-cleaning and produces consistent furrow patterns.

It is another object of this invention to provide a flexible seed drill frame which can adapt itself to varying field conditions and contours. The frame, according to the present invention, is to be divided into several compartments, each of which shall exert an even pressure upon the soil it contacts.

These and other objects will be evident from a study of the following disclosure taken in conjunction with the accompanying drawings. The embodiment of the invention shown is merely exemplary of many forms which can be utilized while retaining the basic concepts of this invention. For this reason the following disclosure is not intended to limit or restrict the scope of the invention which is defined in the annexed claims.

In the drawings:

FIGURE 3 is a front elevational view of the seed drill shown in FIGURE 1;

FIGURE 4 is a rear elevational view of the seed drill shown in FIGURE 1;

FIGURE 5 is a sectional view of one section of the grain drill shown in FIGURE 1 and taken along line 5—5 in FIGURE 1 on a slightly enlarged scale, with portions of the framework of this section being broken away for clarity;

FIGURE 6 is a sectional view taken along line 6—6 in FIGURE 5;

FIGURE 7 is a sectional view taken along line 7—7 in FIGURE 5;

FIGURE 8 is a partial vertical section taken through an alternate form of the presser wheels;

FIGURE 9 is a front view of the shovel on an enlarged scale with the fixed seed delivery tube being broken away at the top;

FIGURE 10 is a side view of the shovel shown in FIGURE 9;

FIGURE 11 is a back view of the shovel shown in FIGURE 9;

FIGURE 12 is a bottom view of the shovel shown in FIGURE 9;

Figure 1:
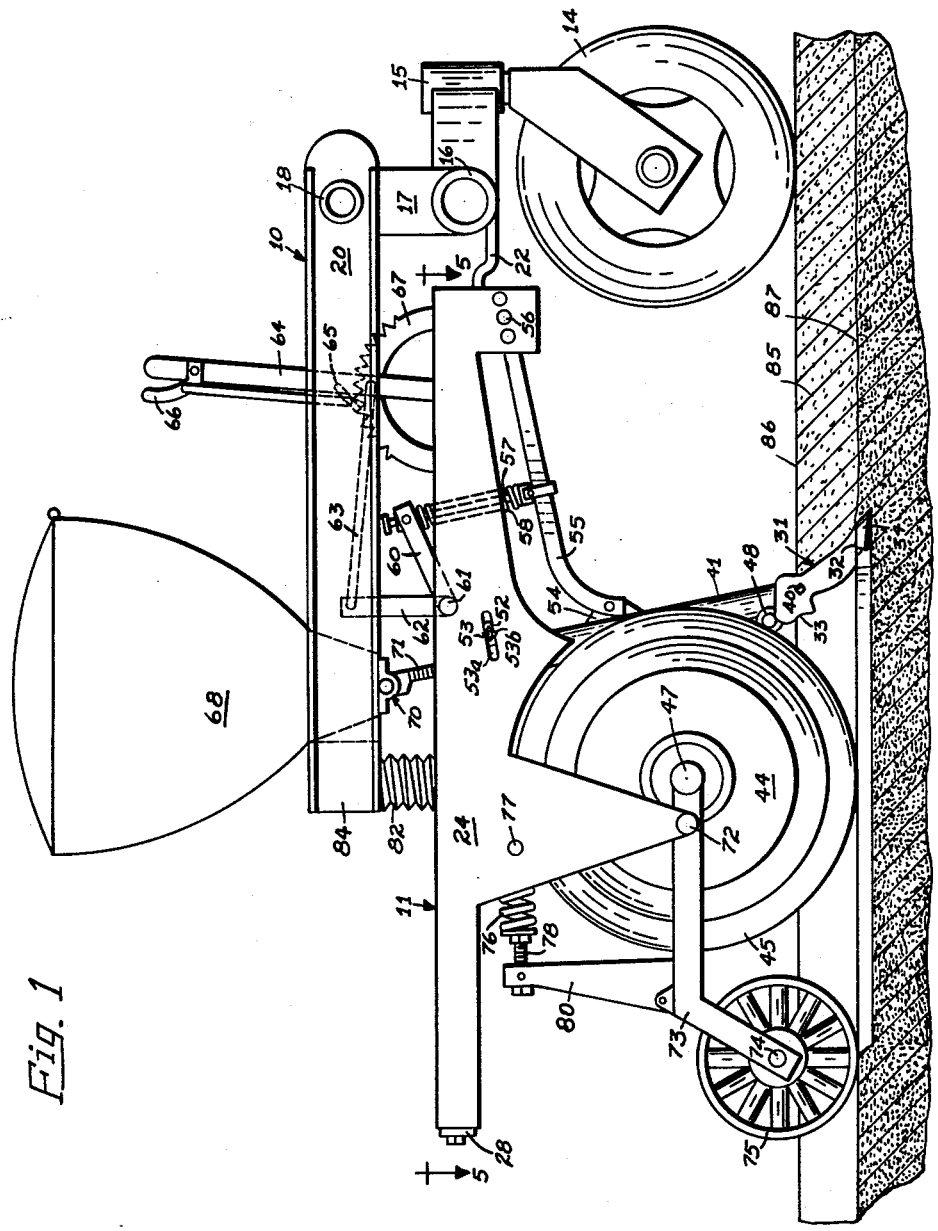
FIGURE 1 is a side view of the grain drill constructed according to the present invention shown in operation, with the soil below the grain drill broken away to show the formation of the furrow.
Figure 2:
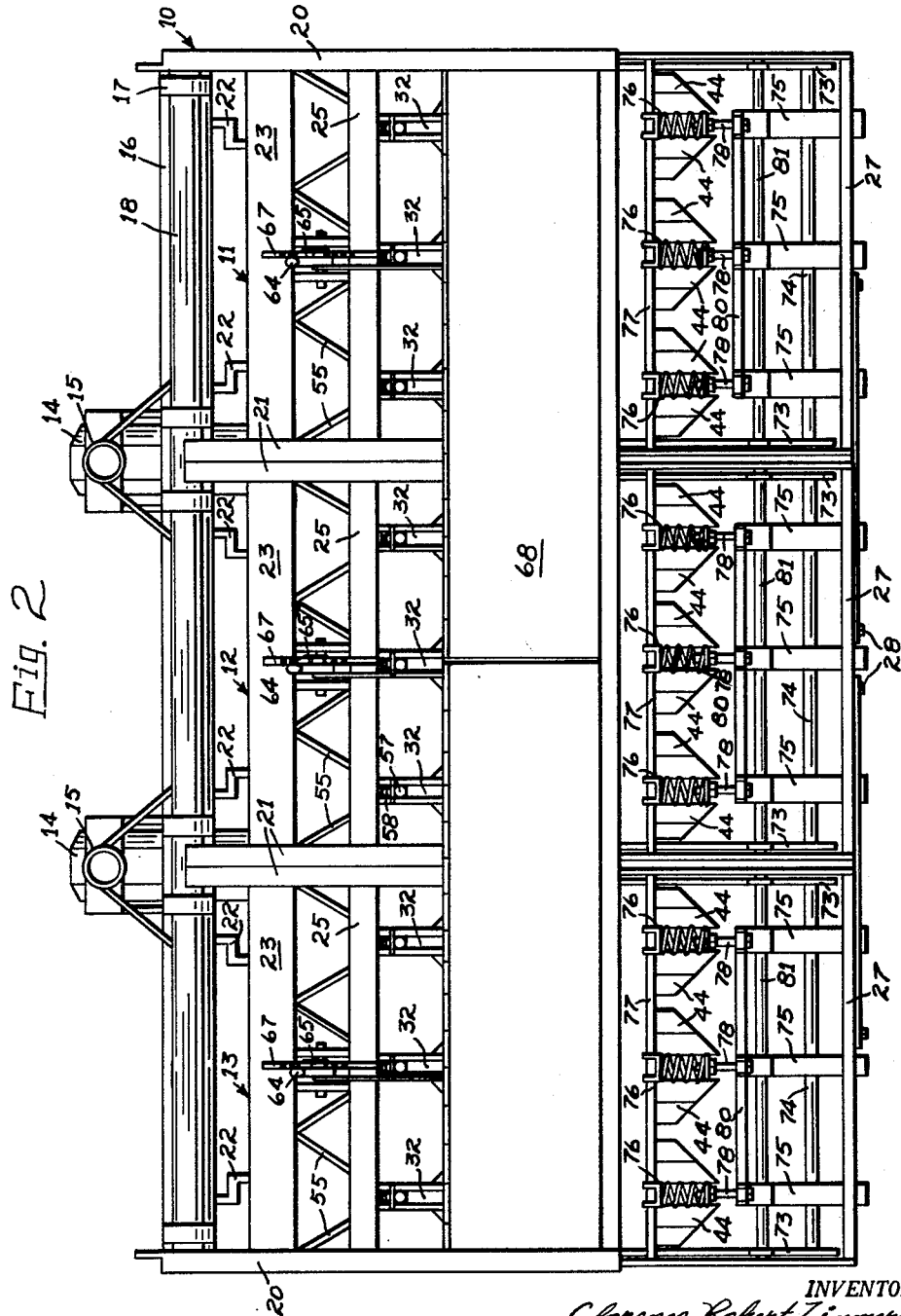
FIGURE 2 is a top plan view of the seed drill shown in FIGURE 1.
Figure 13:
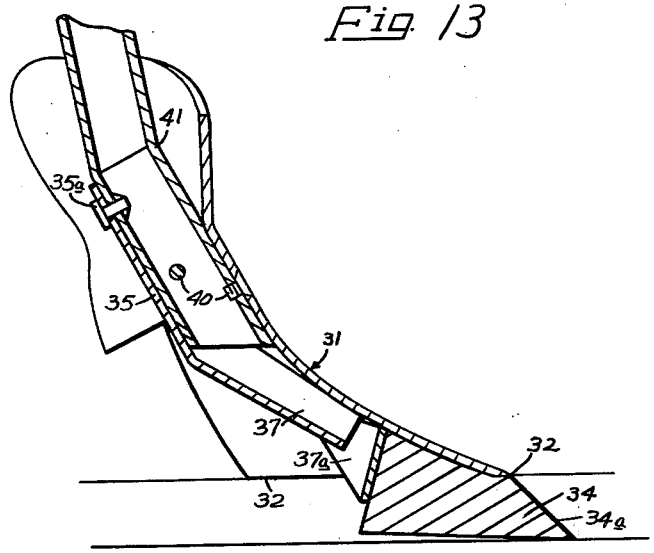
FIGURE 13 is an enlarged sectional view taken on the line 13—13 of FIGURE 9.
Figure 14:
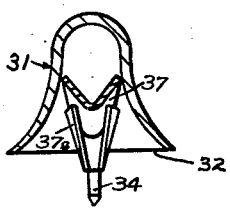
FIGURE 14 is an enlarged sectional view taken on the line 14—14 of FIGURE 10.

The present invention proposes a novel form of seed drill for sowing seeds such as common grains, under conditions wherein a substantial amount of dry loose topsoil is encountered. For proper germination, such seed should be sown an inch or so below the moist soil line, and moist soil should be properly filled in above the seed without undue pressure being exerted thereon. The seed drill shown in the drawings is adapted to be drawn over a field by any suitable propelling means such as a tractor. A suitable hitch will be provided but is not shown in any of the drawings, since such structures are well known in this field. The seed drill shown in the drawings is designed to simultaneously seed nine furrows. However this number is not controlling. It may be varied by increasing or reducing the number of units mounted upon the frame. Again, the frame as shown in the drawings consists of three independently mounted sections and this number also can be increased or reduced as desired. Other modifications possible without deviating from the invention will be described below.

The frame of the machine which is adapted to be drawn over the field to be sown consists of a vertically positioned section designated generally by the numeral 10. This section 10 extends across the transverse width of the machine. It is carried along the ground by a pair of spaced wheels 14 mounted in suitable caster supports 15, which are fixed to a lower transverse pipe 16 which also extends across the width of the seed drill. Braces 17 rigidly connect the pipe 16 with an upper transverse pipe 18. Extending rearwardly from the pipe 18 are a pair of side channels 20 at the outer extremities of the seed drill and intermediate longitudinal channels 21 spaced between them. In the seed drill shown in the drawings, three movable sections 11, 12 and 13 are shown carried behind the pipe 16. These movable sections 11, 12 and 13 can move vertically relative to the section 10. The sections 11, 12 and 13 are supported by pivoted support rods 22 in order to allow one side of each section 11 to 13 to adjust itself vertically relative to its remaining side to thereby allow these sections to adapt to ground contours as encountered. The rods 22 are pivoted to the underside of the pipe 16 and to the underside of a transverse brace 23 at the forward end of each section 11, 12 or 13. In the following discussion only one section 11 to 13 will be described. However, it is to be noted at the outset that the sections are identical and therefore identical numerals will be used in all of the drawings to designate corresponding parts of each section 11 through 13.

The supporting elements in each of these sections 11 through 13 consist of a pair of spaced side plates 24, having the contour shown in FIGURE 1. These side plates are rigidly joined by the brace 23 and by an intermediate transverse brace 25. They are also connected by a transverse suspension channel 26 and by a rear transverse channel 27. Thus, a rigid rectangular frame is provided with protruding portions along the side plates as can be seen by the plate contour shown in FIGURE 1. The rear ends of the sections 11 through 13 are spaced from one another by pivoted links 28 which may be of any desired configuration adapted to insure that the adjacent side plates 24 will not unduly rub against one another.

In order to fully understand the operation of the seed drill it is necessary to first carefully examine the shovels which are utilized to form the proper furrows and to condition the soil for placement of seeds in the furrow. In the present invention nine such shovels are utilized, three being mounted on each of the sections 11 through 13.

Figure 15:
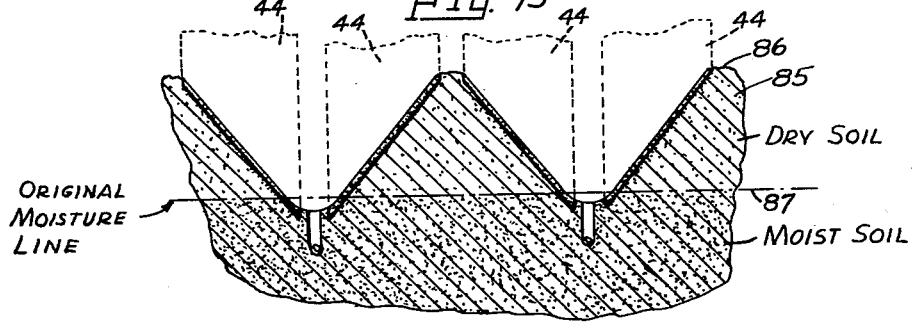
FIGURE 15 is a cross sectional view of the furrows in the soil after planting, the wheels that pack the sides of the furrows being indicated by dotted lines.

Each shovel is identical to all the others. The shovel is shown in detail in FIGURES 9 through 14. Each shovel includes a furrow forming member 31 having a substantially V-shaped horizontal forward cutting edge 32. The member 31 has a pair of rear outwardly flared flanges 33. The forward surface of the member 31 and the flanges 33 are curved so as to direct soil from the lower portions of the furrow upward and outward over the adjacent ground surface. The members 31 are adapted to form furrows having short flattened bottom surfaces and properly sloping side surfaces. This contour of the furrow is best seen in FIGURE 15. The shovel is further provided with a slotting blade 34 fixed to the bottom front part of the member 31 and extending rearwardly beneath the member 31. Each blade 34 includes a front edge 34a which slopes forwardly and downwardly to penetrate hard packed soil. The shovel is mounted at the lower end of a seed delivery tube 41 in the conventional manner. Each section 11, 12, 13 includes three aligned tubes 41, which should be as narrow as possible. A seed guide 35 is fixed to the lower end of tube 41 by a suitable fastener 35a. Guide 35 includes a V-shaped trough 37 which fits within a deflector 37a fixed to the rear edge of blade 34. Thus seed passing through tube 41 will be guided forwardly by trough 37 and will be accurately positioned rearwardly of blade 34 by deflection against deflector 37a.

Mounted directly behind each seed delivery tube 41 is a pair of oppositely facing presser wheels 44. The wheels 44 are shown with conical peripheral rims 45. The wheels as shown, each consists of two portions which build on one another to provide a presser wheel of the desired depth. By utilizing a built-up wheel, each individual farmer may choose the depth of wheel best suited for his conditions. The rim contours of the wheels may be varied so long as they include surfaces designed to laterally compact the side of the furrow cut by the shovels. A form of rim which is quite useful is shown in FIGURE 8. In this figure the rim 46 is shown in section. Rim 46 includes a series of steps 46a designed to laterally compact the sides of the furrow in a terraced configuration.

The presser wheels 44 of each section 11 through 13 are rotatably carried by a suitable axle 47 which is journalled on a wheel framework 73. Each presser wheel 44 is preferably mounted on its supporting axle 47 for lateral adjustment, as will be further explained below. The framework 73 is supported by bearings 72 on the side plates 24. This framework 73 will be further described below. The seed delivery tubes 41 are mounted for vertical motion so as to allow the seed drill to be transported. The tubes 41 are each guided by lower rollers 48 rotatably journalled thereon along their rear edges and protruding forwardly beyond the rear of the tube 41 directly above the shovel. Each of the lower rollers 48 includes a section of very small radius designed to ride on the outermost rim of the adjacent wheel 44. Each roller 48 also includes an adjacent section of greater radius designed to guide the inner edge of the respective wheel 44. Thus, the roller 48 properly aligns the lower end of the seed delivery tube 41 with the two adjacently located presser wheels 44 directly behind it. The upper end of the tube 41 is positioned by biased rollers 50 which are mounted on a shaft 51 and which are urged between the wheels 44 and the back edge of the tube 41 by springs 49. The rollers 50 include an intermediate roller adapted to ride along the back edge of the tube 41 and two side rollers adapted to ride along the edges of the adjacent wheels 44. These rollers are independently rotatable so as to reduce wear on each of these elements. The front edge of the tube 41 is guided by adjustably positioned rollers 52 which are mounted on a cross shaft 53. Each independent portion of the frame is provided with a cross shaft 53 movably guided within slots 53a formed in the respective side plates 24, the cross shafts 53 being fixed relative to the side plates 24 by means of lock nuts 53b. Thus it can be seen that the tube 41 may be held rigidly positioned between the rollers 48, 50 and 52 while retaining the position of the tube adjacent to the inner edges of the wheels 44. It is important to note that the wheels 44 extend across a portion of the sides of the tube 41 to the front portion thereof. This can be best seen in FIGURE 1. The object of this placement is to provide close tracking of the wheels 44 behind the shovel and also to allow the wheels 44 to clear trash which may ride upward from the shovel on the tube 41. As the wheels 44 come downward along the central area of the tubes 41, they will clear this trash and press it into the sides of the furrows which are to be compacted.

The tubes 41 are biased downwardly by a suitable adjustable spring apparatus. Each tube is provided with a forward ear 54, to which is pivoted a curved lever 55. The curvature of the lever 55 enables trash which clears the wheels 44 to ride along the lever 55 and drop off onto the ground. The levers 55 of each section 11 to 13 are pivoted about adjustably positioned pivot shaft 56, depending upon the desired angle of the tube 41. The levers 55 are pivotally connected to a presser rod 57 which is surrounded by a suitable compression spring 58. The spring 58 is abutted by a crank arm 60 which is fixed to a cross shaft 61. Also fixed to the cross shaft 61 is a lever arm 62 which extends upwardly therefrom and which is provided with a connecting rod 63 extending forwardly to a handle 64. The handle 64 can be adjustably positioned by means of a pawl 65 controlled by a release handle 66. The pawl 65 is adapted to contact a conventional semi-circular rack 67 which is mounted on the respective frame sections 11 through 13. In normal operation there will be no direct contact between the crank arms 60 and the pressure rods 57. In effect there will be only a compressive force exerted upon the levers 55 through the medium of the springs 58. This force will be great enough to insure that the bottom of the shovel contacts the soil underlying the loose dry topsoil.

Mounted on the section 10 of the movable frame is a suitable seed supply box 68. The lower portion of this box 68 is provided with a seed supply mechanism 70 which is generally shown in the drawings. The seed is individually supplied to the tubes 41 by means of conduits 71 which are flexible and extend into the apertured tubes 41. This seed supply system is conventional and will not be further described.

The compacting arrangement utilized according to this invention consists of the presser wheels 44 which are designed to compact the sides of the furrow, plus rearwardly mounted packing wheels 75 which are designed to compact the bottom of the furrows left by the shovels. Each packing wheel is mounted on an axle 74 which extends across the wheel framework 73 on which the presser wheels 44 are also journalled. The wheel framework 73 is a rigid structure and is pivoted about the previously described bearing 72 on the side plates 24. The framework 73 normally is not biased by any external mechanism. The pressure distribution between the wheels 44 and the packing wheels 75 is achieved by properly spacing the axles 47 and 74 from the bearing supports 72. As can be seen in FIGURE 1, the lever arm afforded the smaller packing wheels 75 is many times greater than that afforded the presser wheels 44. Since the pivot point is very close to the presser wheels 44, the pressure exerted by the packing wheels 75 will be substantially uniform. Movement of the wheels 44 in a vertical position will not exert a great deal of pressure upon the rear wheels 75. In order to limit the amount of pressure exerted by the rear packing wheels 75, a spring support is provided. The individual springs 76 extend from the pivot shaft 77 which is fixed across the plates 24 of each unit 11 through 13. The rear ends of the springs 76 are connected by an adjustable screw 78 to a lever frame 80. The frame 80 is pivoted about a shaft 81 extending across the framework 73. As can be seen in FIGURE 1, the springs 76 will prevent the wheels 75 from moving downwardly with a great deal of pressure, should the wheels 44 be raised a substantial distance, as for instance when the wheels 44 ride over a rock or other obstruction in the cut furrow.

In order to provide substantially constant pressure upon all of the packing wheels 75 and the presser wheels 44, the present invention contemplates the use of an air suspension system between the relatively fixed frame 10 and the movable frames 11 through 13. Each of the movable sections 11 through 13 is provided with a pair of spaced bellows 82 which are sealed to a cross tank 84, mounted between the side channels 20 of the vertically positioned section 10 of the frame. Interior of the bellows 82 may include a suitable spring 83, as can be seen in FIGURE 5. Since the tank 84 is relatively large in comparison to the bellows 82 it will maintain a constant pressure within each of the bellows regardless of its extension. Therefore, each of the movable sections 11 through 13 may adjust itself vertically to the ground contour and will be assured of the proper constant pressure which will be exerted upon the suspension channels 26 of each section 11 through 13 through the bellows 82. This suspension arrangement will be of particular value for hillside work to insure that the lower unit of the drill will carry the weight of the apparatus equally with those located on higher ground.

In operation the present seed drill will be drawn by a tractor over the field to be sown. The adjustment of the springs 58 will be such as to insure that the shovels will dig through the loose topsoil to a depth just slightly below the moisture line. As seen in FIGURE 1, the loose topsoil 85 extends from the ground surface 86 to the moisture line 87. The edge 32 rides just slightly below the line 87. This is desirable in order to lift and spread a layer of moist soil along the furrow sides in order to thereby insure better compacting of the furrow sides. The blade 34 having its tip at the lower front edge cuts through the soil below the level of the edge 32 even though this lower soil is compacted. As the frame traverses the field the blades 34 open seed receiving trenches in the bottoms of the furrows. The seed is delivered at the desired rate through the tubes 41 into the bottoms of the trenches while the soil is held back by the shovel 31. Immediately behind each shovel the presser wheels 44 compact the sides of the furrows formed by the respective shovels 31. In actual practice a glazed, hard furrow side is attained due to passage of wheels 44. This insures that the loose side soils do not fall back upon the sown seeds. Again directly behind the wheels 44 the packing wheels 75 exert a constant pressure upon the bottom of the furrow and thereby close the slotted portion about the seeds before any dry dirt can fall back, to thereby properly prepare the seeds for germination. The pressure exerted by the packing wheels is substantially constant as described above and will not substantially vary regardless of the movement of the presser wheels 44 or the adjustment of the sections 11 through 13 allowed by the bellows 82. Thus, all of the seed is properly planted in the moist soil 88 and the sprouts are protected from the danger of having too much dry loose soil falling down over the sprouts. This enables the sprouts to grow and reach the soil surface after proper germination.

Thus it can be seen that an improved seed drill has been described which properly sows seed in moist soil under what are now very difficult conditions. The close placement of the shovels and presser wheels insures proper tracking of the compacting arrangement behind the shovels. The fact that the seed is placed in the seed trench at the rear end of the blade which cuts the slots at the bottom of the furrow insures that the seed will be properly placed even while the seed drill is being turned or operated on a steep hillside. This is extremely important since better yields are available with uniform placement of all the seed in the field. The structure shown in the drawings is quite strong and is fully capable of handling field conditions which exist in the hilly country. The pressure arrangement is very uniform and can be adjusted to meet conditions normally encountered in such areas.

The pressure exerted by packing wheels 75 should preferably be the minimum pressure necessary to properly cover the sown seed. It has been demonstrated that packing the soil over the seeds can result in substantial lessening of the crop yield. Under some conditions it may be found best to completely eliminate the pressure exerted by packing wheels 75 by adjustment of screws 78. In any case, the supporting structure for wheels 44 and 75 will insure that the minimum packing pressure will be retained and that undue packing of the soil cover will not occur.

A common problem in sowing wheat is the fact that any rain which occurs between the time that the seed is sown and the time that the sprout reaches the soil surface tends to form a crust on the surface through which the sprout must break. If the seed is covered by more than several inches of loose soil, the sprout is diverted and weak before it reaches this crust and therefore will fail to break through it. By accurately controlling the depth of soil over the seed to a limit of one or two inches at a maximum, the present invention enables the new strong sprouts to force their way through the surface crust and therefore increases the probability of a successful crop from a single seeding.

The lateral adjustment of each pair of presser wheels 44 relative to their associated shovels can be accomplished by selective placement of wheels 44 on their supporting axles. By properly utilizing this combination of wheels and shovels, one may place seed in the necessary moist soil and prevent dry soil from falling back over the seed under a variety of field conditions. The drill is usable under extremely wet conditions, where a shallow furrow is desirable, with no dry cover. This can be insured by widening the separation of the presser wheels 44. When insulation is desirable, the furrow may be narrowed by bringing the pairs of presser wheels toward one another. Since packing of the furrow sides is insured, this drill may be utilized to plant seed at depths far in excess of those now believed to be limiting. Plantings at nine or ten inches depth are entirely possible.

Since the main weight of the drill rests on wheels 44, one may enlarge the seed supply box 68 for a greater capacity and longer use between refills. The additional weight of seed aids in the compacting of the furrow sides.

The drill is usable on steep hillsides through trash and mulch. In any event, true tracking of the presser wheels 44 will occur, and the seed will be accurately placed in the bottom of each furrow. Deep furrows may be utilized for winter protection when required. Since this drill utilizes an in-line shovel configuration, it may be pulled at a faster speed than present, staggered shovel hillside drills.

The shovel assemblies are protected from rock damage by the yieldable springs 58. These springs 58 and their associated linkages allow each shovel to move independently of the wheels 44. Should a rock be struck by the blade 34, the shovel 31 moves upward and slightly rearward and therefore clears the rock without damage.

Since the seed delivery mechanism is common to seed drills now in use, no specific details of this construction have been given. Any suitable driving mechanism may be utilized to feed the seed properly to conduits 71.

The shovel and presser wheel arrangement according to this invention insures an even layer of dry soil over the seed receiving trench. For each separation spacing of the presser wheels, one will obtain a constant cover of dry soil regardless of varying depths necessary to reach the moist soil. By utilizing a common hydraulic depth control system one may operate this combination under any given field conditions and be assured of accurate seed covering for most effective planting.

Various modifications may occur to those trained in this field without deviating from the basic principles of this invention as described above. Therefore, only the following claims are intended to define the extent of my invention.

This is a continuation-in-part of my co-pending application, Ser. No. 98,052, filed March 24, 1961, now abandoned for Seed Drill.

Having thus described my invention, I claim:

1. A seed drill comprising:
a frame adapted to be drawn over a field to be sown;
a shovel having a supporting shank suspended from the frame, said shovel being in parallel alignment with the direction of travel of the frame and positioned to cut a furrow through the soil surface;
seed supply means mounted on said frame operatively connected to said shovel and extending downwardly behind the shovel adapted to direct seed to the bottom of the furrow cut by said shovel;
and pressure wheel means mounted to the frame independently of said shovel, said pressure wheel means being located behind the shovel and extending upwardly parallel to each other alongside of and overlapping the supporting shank of the shovel above the shovel, said pressure wheel means further having outer ground engaging surfaces inclined toward the axis of the wheel means as they recede from the shank.

2. A seed drill comprising:
a supporting frame adapted to be drawn over a field to be sown;
a shovel including a supporting shank suspended from the frame, an opening shoe fixed to said shank and having a configuration adapted to shear dry top soil with a thin slice of lower moist soil and to lay the slice over onto the side faces of the furrow formed thereby, and a seed trench opening blade mounted on said shoe immediately beneath it, said blade having a forwardly and downwardly extending tip adapted to cut packed soil with a minimum amount of lateral disturbance;
and a pair of symmetrical pressure wheels mounted on said frame, said wheels extending upwardly parallel to each other one on each side of said shank and adjacent thereto, so as to drag trash from said shank, said wheels each having a peripheral surface sloping toward its axis outwardly from the transverse center thereof, adapted to press the side faces of the furrow left by said shovel.

3. A shovel comprising:
an opening shoe having a V-shaped horizontal forward cutting edge adapted to slice through soil, the shoe top surface being curved upwardly and rearwardly from said edge to thereby turn over soil sliced by said edge;
a slotting blade mounted on said shoe having a front edge extended forwardly and downwardly from the tip of said cutting edge and terminating in a point below and forward of said cutting edge to thereby penetrate packed soil, the blade being extended rearwardly beneath the shoe to thereby open a seed receiving trench;
and means mounted on said shoe adapted to direct seeds into the trench formed by passage of said blade.

4. A seed drill comprising:
a frame adapted to be drawn over a field to be sown;
an axially apertured shovel support mounted on said frame in a vertical position and extending downwardly therefrom toward the soil surface of the field;
a shovel fixed to the lower end of said shovel support in engagement with the soil surface, said shovel including a furrow opening blade adapted to cut into the soil to thereby form a furrow having sloped sides and further including slotting blade means mounted on said opening blade and projecting downwardly therefrom, said slotting blade means being adapted to form a slotted configuration along the bottom of the furrow between its sloped sides, said furrow opening blade and said slotting blade means extending forward of the open lower end of said axially apertured shovel support;
seed supply means mounted on said frame, said seed supply means being adapted to direct seed through said axially apertured shovel support to the furrow;
and pressure wheel means having a horizontal axle mounted on said frame behind the shovel and having spaced apart outer rim edges, the forwardmost portions of which are above the shovel and overlapping the shovel support, said pressure wheel means having outer ground engaging surfaces inclined toward said axle as they recede from said shovel support.

5. A seed drill comprising:
a mobile frame adapted to be drawn over a field to be sown in parallel rows;
a seed delivery tube mounted on said frame extending downwardly and forwardly therefrom in the direction of travel of said frame;
a shovel fixed to the lower end of said seed delivery tube including an opening shoe having a V-shaped horizontal forward cutting edge adapted to slice through soil, the upper shoe surface being curved upwardly and rearwardly from said edge to thereby turn over soil sliced by said edge, said shovel further including a slotting blade mounted on said shoe having a front edge extended forwardly and downwardly from the front tip of said cutting edge and terminating in a point below and forward of said edge to thereby penetrate packed soil, the blade being extended rearwardly beneath the shoe to thereby open a seed receiving trench, the lower end of said seed delivery tube being opened directly rearward of said blade and in longitudinal alignment therewith.

6. A seed drill as defined in claim 5 further comprising:
two pressure wheels having a common horizontal axis, said wheels being mounted on said frame behind the shovel and having a portion of said seed delivery tube between the forwardmost portions thereof, said forwardmost portions being in close proximity to the portion of the seed delivery tube whereby to wipe down trash from said tube, each of said wheels having outer ground engaging surfaces inclined toward the wheel axis to press soil outwardly as well as downwardly as the wheel rolls over it.

7. A shovel comprising:
an opening shoe adapted to be secured to the lower end of a supporting seed delivery tube and having a V-shaped horizontal forward cutting edge adapted to slice through soil, the top surface being curved upwardly and rearwardly from said edge to thereby turn over soil sliced by said edge;
a slotting blade fixed on said shoe having a front edge extended forwardly and downwardly from the tip of said edge and terminating in a point below and forward of said edge to thereby penetrate packed soil, the blade being extended rearwardly beneath the shoe to thereby open a seed receiving trench, the rear edge of said blade being extended rearwardly and downwardly from said shoe;
a seed guide adapted to cover the open lower end of the supporting seed delivery tube and including a V-shaped trough leading downwardly and forwardly to a location directly rearward and adjacent to the rear edge of said blade;
and a deflector fixed to the rear edge of said blade and extending rearwardly therefrom at each side of said trough to thereby deflect seeds in said trough to a line directly in alignment with said blade.

8. A seed drill comprising:
a frame adapted to be drawn over a field to be sown;
a shovel having a supporting shank suspended from the frame, said shovel being in parallel alignment with the direction of travel of the frame and positioned to cut a furrow through the soil surface;

seed supply means mounted on said frame operatively connected to said shovel and extending downwardly behind the shovel adapted to direct seed to the bottom of the furrow cut by said shovel;

and pressure wheel means mounted to the frame behind the shovel comprising a pair of parallel press wheels on a common axis having surface portions juxtaposed to the shovel shank adapted to wipe accumulated trash downward from the shank, said pressure wheel means having outer ground engaging surfaces inclined toward the axis of the wheel means as they recede from the shank.

References Cited by the Examiner

UNITED STATES PATENTS

| | | | |
|---|---|---|---|
| 9,894 | 8/53 | Caswell | 111—85 |
| 230,235 | 7/80 | Caldwell | 172—731 |
| 350,752 | 10/86 | Laning | 111—86 X |
| 742,872 | 11/03 | Jacobs | 111—83 |
| 815,048 | 3/06 | Smith | 172—176 |
| 1,143,907 | 6/15 | Hedges | 172—720 |
| 1,150,537 | 8/15 | Roby | 172—538 |
| 1,396,037 | 11/21 | Garst | 172—537 X |
| 1,574,917 | 3/26 | Mitchell | 111—86 |
| 1,668,391 | 5/28 | Bailey | 111—86 |
| 1,897,421 | 2/33 | Dempster | 111—52 |
| 1,901,298 | 3/33 | Johnson | 111—52 |
| 2,001,003 | 5/35 | Tuft | 111—86 |
| 2,554,061 | 5/51 | Sandberg | 111—85 |
| 2,569,870 | 10/51 | Roberts | 172—176 |
| 2,577,775 | 12/51 | Lemmon | 111—85 |
| 2,694,356 | 11/54 | Haas | 172—176 |
| 2,885,978 | 5/59 | Miller | 111—86 |
| 3,033,135 | 5/62 | Gouin | 111—52 |

FOREIGN PATENTS

| | | |
|---|---|---|
| 103,830 | 4/38 | Australia. |
| 95,076 | 11/23 | Austria. |
| 51,721 | 6/36 | Denmark. |
| 857,996 | 5/40 | France. |
| 677,874 | 8/52 | Great Britain. |
| 76,898 | 1/55 | Netherlands. |
| 278,846 | 2/52 | Switzerland. |

ABRAHAM G. STONE, *Primary Examiner.*

A. JOSEPH GOLDBERG, WILLIAM A. SMITH III, *Examiners.*